United States Patent [19]

Mogilnicki

[11] Patent Number: 5,383,673
[45] Date of Patent: Jan. 24, 1995

[54] COLLET FOR A SQUARE-SHANK TAP

[75] Inventor: Victor D. Mogilnicki, Raleigh, N.C.

[73] Assignee: Kennametal Inc., Latrobe, Pa.

[21] Appl. No.: 102,029

[22] Filed: Aug. 3, 1993

[51] Int. Cl.⁶ ............................................. B23B 31/20
[52] U.S. Cl. .................................... 279/46.4; 279/49
[58] Field of Search ................. 279/46.4, 54, 48, 49, 279/56

[56] References Cited

U.S. PATENT DOCUMENTS

| | | | |
|---|---|---|---|
| 1,252,335 | 1/1918 | Foote | 279/54 |
| 2,098,675 | 11/1937 | Procunier | 279/49 X |
| 2,141,786 | 12/1938 | Helgerud | 279/156 X |
| 2,778,650 | 1/1957 | Benjamin et al. | 279/46.4 X |
| 3,425,705 | 2/1969 | Benjamin et al. | 279/49 |

*Primary Examiner*—Steven C. Bishop
*Attorney, Agent, or Firm*—James G. Porcelli

[57] ABSTRACT

A collet is designed for a tool having a cylindrical shank and a square drive at the rearward end of the cylindrical shank. The collet includes a collet body having a plurality of radially compressible collet segments. An axial bore is formed in the collet body for receiving the cylindrical shank of the tool. The tool is secured in the axial bore by collapsing the collet segments around the cylindrical shank of the tool. A grip-forming slot extends through a midsection of the collet body and communicates with the axial bore so as to receive the square drive of the tool when the tool is inserted into the axial bore. A pair of gripping surfaces are formed on respective collet segments on opposite sides of the grip-forming slot for gripping opposed surfaces of the square drive when the collet segments are radially collapsed to prevent radial movement of the tool.

11 Claims, 4 Drawing Sheets

COLLET FOR A SQUARE-SHANK TAP

FIELD OF THE INVENTION

The present invention relates generally to a collet chuck in which the cylindrical shank of a tool is gripped by a collapsible collet. More particularly, the present invention relates to collapsible collets for gripping a square shank tap.

BACKGROUND OF THE INVENTION

Collet chucks provide a simple, inexpensive method for gripping and transmitting torque to a straight, cylindrical shank of a tool. The collet typically has a tapered outer surface and a straight axial bore for receiving the cylindrical shank of the tool. The collet includes a plurality of axial slots with alternating front and rear ties which are equally spaced around the collet. A lock nut is used to apply an axial load to the collet to force the collet into a tapered bore in a holder. The tapered wall of the bore collapses the collet causing it to grip the shank of the tool.

Collet chucks of the type described rely on the gripping force generated by the collet to resist axial and radial movement of the tool. In certain machine operations where high torque loads are generated, the gripping force generated by the collet may not always be sufficient to prevent radial slipping. For this reason, some types of tools, such as thread-forming taps, have a square drive on the end of the shank. Collets have been specifically designed to grip on the square drive of the shank to prevent radial slipping of the tap and to provide positive torque transmission.

One method for gripping the square drive of the tap is to broach a square hole in the collet for receiving the square drive of the tap. Another type of collet receives the four corners of the square drive in the axial slots of the collet. This type of collet obliquely engages the four corners of the square drive to transmit torque to the tool. Each of these methods allow some radial movement of the tap which is undesirable and do not always align the tool accurately. Also, collets using these methods require additional machining operations and extra parts which increases the cost of producing the collet.

SUMMARY AND OBJECTS OF THE INVENTION

The present invention is a collet for gripping the square drive of a tap or similar tool without radial slipping. The collet comprises a collet body having a tapered outer surface and a straight axial bore for receiving the cylindrical shank of the tap. The collet body is formed with a plurality of axial slots with alternating front and rear ties. A grip-forming slot is formed in a midsection of the collet and communicates with the axial bore so as to receive the square drive of the shank when the tool is inserted into the axial bore. A pair of gripping surfaces are formed in the midsection of the collet on opposite sides of the grip-forming slot for gripping opposed surfaces of the square drive.

When the collet is collapsed, the gripping surfaces close down on opposed flats of the square drive to prevent radial movement of the tap. The front end of the collet grips on the cylindrical portion of the shank 90° from the grip-forming slot. This increases the accuracy in the alignment of the collet since the tap is gripped at both the front and rear ends.

The present invention can be used in standard collet chucks without modification, thus reducing the number of collet chucks which must be kept on hand. Further, the collet of the present invention is relatively inexpensive to produce since no extra parts are required.

DETAILED DESCRIPTION OF THE INVENTION

Figure 1:
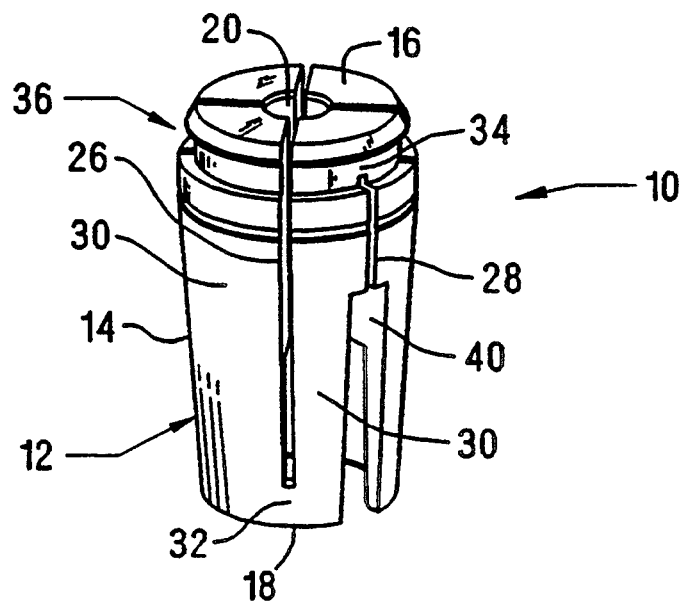
FIG. 1 is a perspective view of the collet of the present invention.
Figure 2:
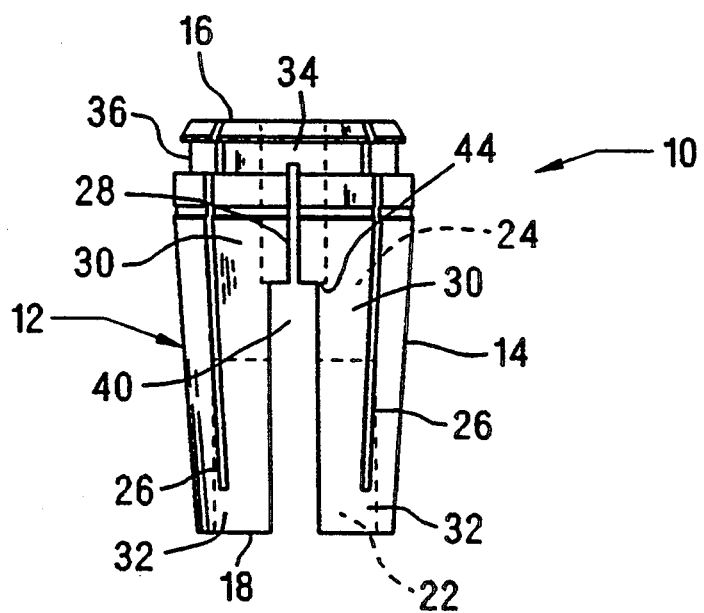
FIG. 2 is an elevation view of the collet.
Figure 3:
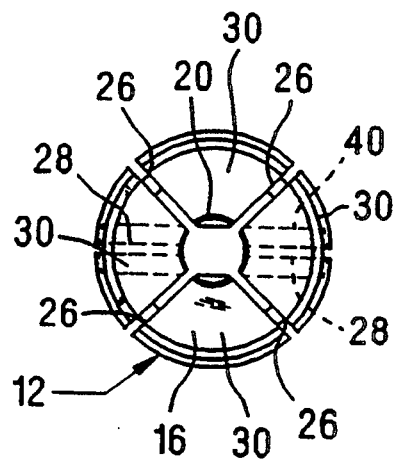
FIG. 3 is a top plan view of the collet.
Figure 4:
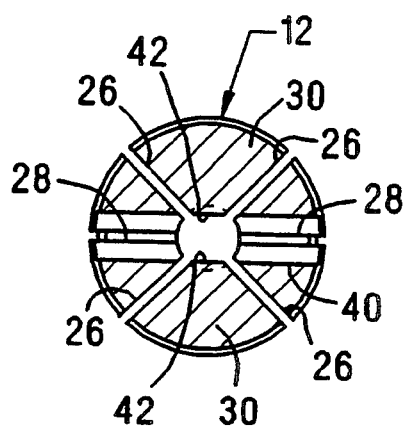
FIG. 4 is a cross-sectional view of the collet taken through the midsection.
Figure 5:
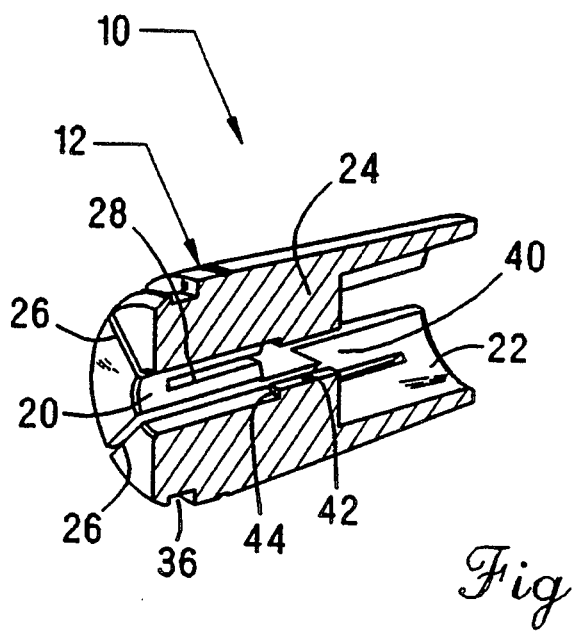
FIG. 5 is a longitudinal-section view of the collet shown in perspective from the front end of the collet.
Figure 6:
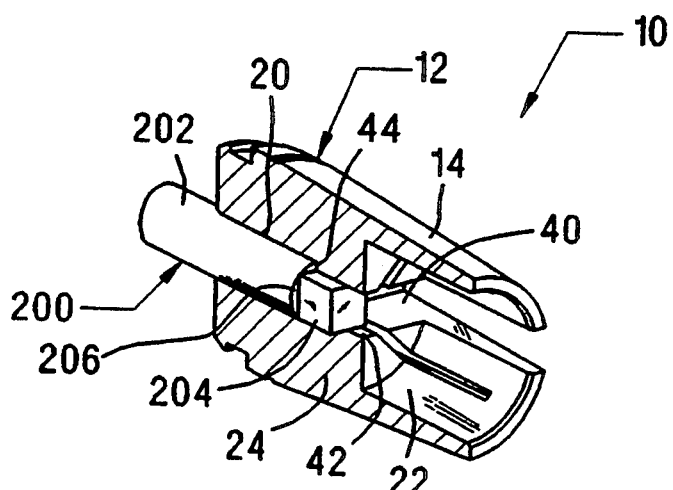
FIG. 6 is a longitudinal-section view of the collet with the tool inserted shown in perspective from the rear end of the collet.

Referring now to FIGS. 1–6, the collet of the present invention is shown therein and indicated generally by the numeral 10. The collet 10 of the present invention is particularly designed to engage the square drive of a tap or similar tool 200. The tool 200 includes a cylindrical shank 202 and a square drive 204 disposed at the rear end of the cylindrical shank 202. (See FIG. 6) The square drive 204 is formed by grinding the shank 202. Since the width of the square drive 204 is less than the diameter of the shank 202, a stop 206 is formed at the junction of the square drive 204 and the cylindrical shank 202.

The collet 10 includes a collet body 12 having a tapered outer surface 14. The collet body 12 includes a forward end 16 and a rearward end 18. An axial bore 20 is formed in the collet body 12 and extends from the forward end 16. The axial bore 20 is sized to receive the cylindrical shank 202 of the tap 200. A recess 22 extends into the collet body 12 from the rearward end 18. The area between the bottom of the axial bore 20 and the recess 22 is the midsection 24.

A plurality of axial slots 26, 28 extend through the collet body 12 and divide the collet body 12 into a plurality of collet segments 30. Axial slots 26 begin at a forward end 16 of the collet body 12 and extend to a solid tie 32 adjacent the rearward end 18. A total of four axial slots 26 are provided and are disposed at 90° increments as most clearly seen in FIG. 3. Axial slots 28 begin at a rearward end 18 of the collet body 12 and extend forwardly to a solid tie 34 adjacent the forward end 16. Two axial slots 28 are provided and are disposed 180° apart from one another. The axial slots 26, 28 allow the collet segments 30 to radially collapse within a holder (described below) to grip the cylindrical shank 202 of the tool 200.

A grip-forming slot 40 is formed in the midsection 24 of the collet body 12. In the disclosed embodiment, the grip-forming slot 40 forms an enlarged portion in the axial slots 28 and extends from the rearward end 16 of the collet body 12 into the midsection 24. The grip-forming slot 34 terminates adjacent the bottom end of the axial bore 20. The width of the grip-forming slot 40 is equal to the width of the square drive 204 so as to be capable of receiving the square drive 204 when the tool 200 is inserted into the axial bore 20.

A pair of flat, gripping surfaces 42 are formed on respective collet segments 30 in the midsection 24 of the collet body 12. The gripping surfaces 42 are disposed on opposite sides of the grip-forming slot 40. Since the grip-forming slot 40 is narrower than the diameter of the axial bore 18, a shoulder 44 is formed at the bottom of the axial bore 20 adjacent the gripping surfaces 42. The shoulder 44 engages the stop 206 on the tool 200 when the tool 200 is inserted into the collet 10.

Figure 7:
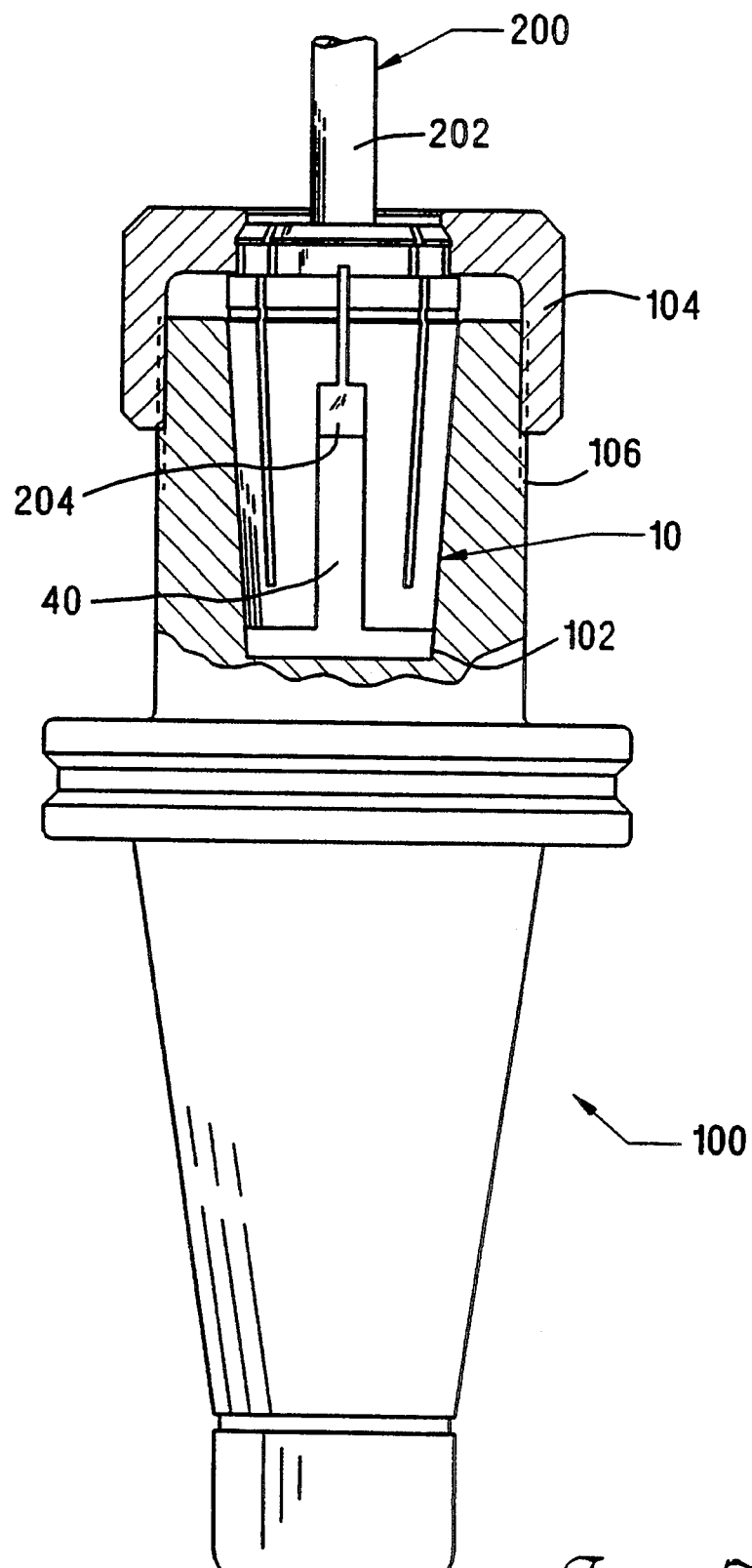
FIG. 7 is an elevational view of a chuck with a portion thereof shown in section to reveal the collet.

Referring to FIG. 7, the collet 10 is received in the tapered bore 102 of a holder 100. The tapered bore 102 is tapered to cooperate with the tapered outer surface 14 of the collet body 12. The collet 10 is pressed into the tapered bore 102 by means of a nut 104 which screws onto a threaded portion 106 on the holder 100. The nut 104 includes an inwardly projecting flange 108 which engages the peripheral groove 36 on the collet body 12. When the nut 104 is tightened, an axial force is applied to the collet 10 to press the collet 10 into the tapered bore 102 of the holder 100. As the collet 10 is pressed into the tapered bore 102, the collet segments 30 collapse inwardly to grip the cylindrical shank 202 of the tool 200 adjacent the forward end 16 of the collet 10. Additionally, the gripping surfaces 42 grip opposed flats of the square drive 204 of the tap 200. In the described embodiment, the collet segments 30 will grip the cylindrical shank 202 approximately 90° from where the gripping surfaces 42 engage the square drive 204. This 90° angular displacement in the gripping contact improves accuracy by aligning the tool 200 along the axis of the collet 10.

In use, the shank 202 of the tool 200 is inserted into the axial bore 20 of the collet 10 until the stop 206 on the tool 200 engages the shoulder 44 at the bottom of the axial bore 20. In this position, the square drive 204 extends into the grip-forming slot 40 and is disposed between the gripping surfaces 42. When the lock nut 104 is tightened on the holder 100, the collet segments 30 collapse inwardly as previously described. The collapse of the collet segments 30 cause the gripping surfaces 42 to grip on the flats of the square drive 204. Also, the collet segments 30 grip on the cylindrical shank 202 at the forward end of the collet 10.

The collet 10 prevents radial slipping by engaging on the flats of a square drive 204 while at the same time improving accuracy in tap alignment. Further, the collet 10 of the present invention is relatively inexpensive to produce and can be used with standard holders 100 without any modification.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A collet for a tool having a cylindrical shank and a square drive comprising:
    (a) a collet body having a forward end, a midsection, and a rearward end;
    (b) an axial bore extending from the forward end of the collet body and terminating at the midsection for receiving the cylindrical shank of the tool;
    (c) a plurality of axial slots formed in the collet body so as to define a plurality of radially compressible collet segments, said axial slots including a first axial slot open at the forward end of the collet body and a second axial slot open at the rearward end of the collet body;
    (d) a gripping slot extending transversely through the midsection of the collet body and communicating with the axial bore so as to receive the square drive of the tool when the tool is inserted into the axial bore, wherein the width of the gripping slot is at least equal to the width of the square drive, and wherein the gripping slot is formed along a portion of said second axial slot extending from said rearward end of said collet to said midsection of said collet; and
    (e) a pair of gripping surfaces formed in the midsection of the collet body on opposite sides of the gripping slot for gripping only two opposed surfaces of the square drive when the collet is radially collapsed to prevent radial movement of the tool.

2. The collet according to claim 1 further including a stop formed in the axial bore for engaging a stop on the tool when the tool is inserted into the axial bore.

3. The collet according to claim 1 wherein the outer surface of the collet body tapers inwardly from a forward end of the collet body towards the rearward end thereof.

4. The collet according to claim 3 wherein the taper is approximately 8° relative to the axis of the collet.

5. The collet of claim 1 wherein the collet segments grip the cylindrical shank of the tool at the forward end of the collet approximately 90° relative to the gripping surfaces.

6. A collet for a tool having a cylindrical shank and a square drive comprising:
    (a) a collet body having a forward end, a midsection, and a rearward end;
    (b) an axial bore extending from the forward end of the collet body and terminating at the midsection for receiving the cylindrical shank of the tool;
    (c) a plurality of axial slots formed in the collet body so as to define a plurality of radially compressible collet segments, said axial slots including a first axial slot open at the forward end of the collet body and a second axial slot open at the rearward end of the collet body;
    (d) wherein said second axial slot includes a relatively wide rearward portion extending from the rearward end of the collet body to the midsection, and a relatively narrow forward section extending forwardly from the rearward section, the rearward section communicating with the axial bore so as to receive the square drive of the tool when the tool is inserted into the axial bore; and
    (e) a pair of gripping surfaces formed in the midsection of the collet body on opposite sides of the rearward section of the second axial slot for gripping opposed surfaces of the square drive when the collet is radially collapsed.

7. The collet according to claim 6 further including a stop formed in the axial bore for engaging a stop on the tool when the tool is inserted into the axial bore.

8. The collet according to claim 6 wherein the outer surface of the collet body tapers inwardly from a forward end of the collet body towards the rearward end thereof.

9. The collet according to claim 8 wherein said taper is approximately 8° relative to the axis of said collet.

10. The collet of claim 6 wherein the collet segments grip the cylindrical shank of the tool at the forward end of the collet approximately 90° relative to the gripping surfaces.

11. The collet of claim 6 further including a recess formed in a rearward end of the collet body.

* * * * *